Figure 1:
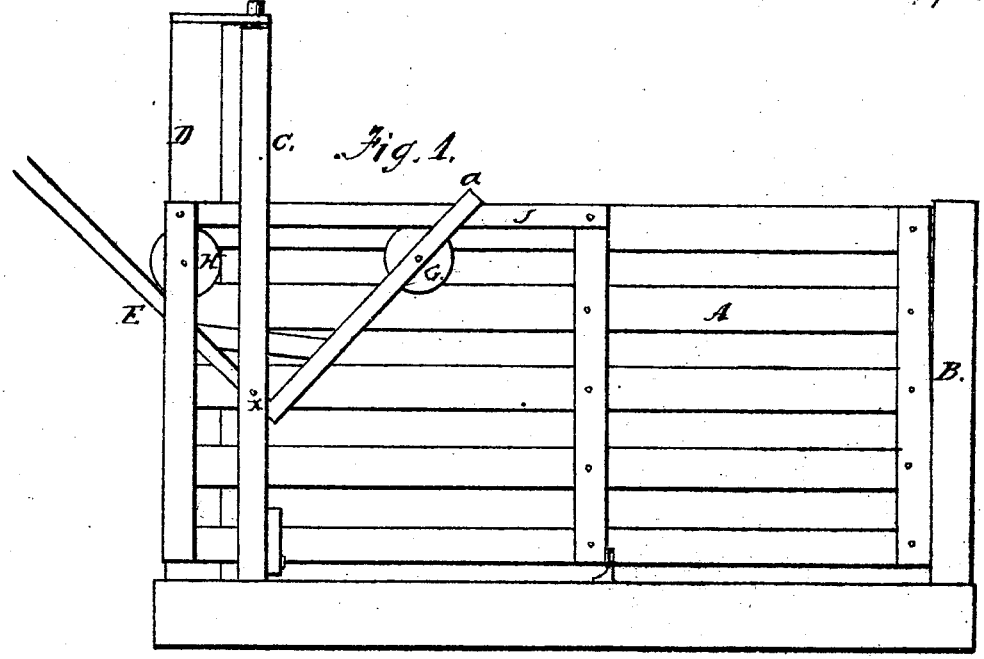
Figure 2:
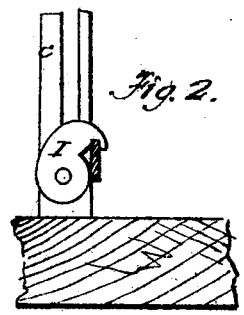

F. R. Sherman.
Gate.

N° 73129.  Patented Jan. 7, 1868.

attest:
A. H. Marr
A. H. Blue

Inventor;
F. R. Sherman
by
Alexander & Mason
Atty

United States Patent Office.

FRANKLIN R. SHERMAN, OF DOWAGIAC, MICHIGAN.

Letters Patent No. 73,129, dated January 7, 1868.

IMPROVEMENT IN GATES.

*The Schedule referred to in these Letters Patent and making part of the same.*

TO ALL WHOM IT MAY CONCERN:

Be it known that I, FRANKLIN R. SHERMAN, of Dowagiac, in the county of Cass, and in the State of Michigan, have invented certain new and useful Improvements in Gates; and do hereby declare that the following is a full, clear, and exact description thereof, reference being had to the accompanying drawings, and to the letters of reference marked thereon.

In the annexed drawings, A represents a farm-gate, of any known and usual construction. B represents the front post. C and D represent two rear posts, one of which is stationary, the other partially revolves. The post C has a long slot in it, from near its top to near its bottom. Within this slot is pivoted a triangular frame, E. This frame has pivoted to it a pulley or wheel, G, and the gate has, near its top at its rear end, pivoted to it a wheel, H. J represents an additional slat, secured to the top rail or slat of the gate. The lower edge of slat J rests upon wheel G, and the upper edge of arm $d$ of frame E rests against the under side of wheel H.

This gate may be opened in two ways. It may be shoved directly backward, in which case its rear end is supported by the frame E. When it has been moved backward half its length, it then swings around upon and with the partially-revolving post C. I represents a catch, which is secured to the post C, near its rear end, and which catches into a notch cut in one of the slats of the gate. This catch is used to lock the gate, to keep it from being moved backward. When this is the case, the gate may be swung around without moving it back, the post C acting as a pivot for it. The post C has one bearing in a sill at its bottom, and in an arm which projects from the upper end of post D at its top.

Having thus fully described my invention, what I claim as new, and desire to secure by Letters Patent, is—

The frame E, used in combination with the gate, the wheels G and H, and the post C, substantially as and for the purpose set forth.

In testimony that I claim the foregoing, I have hereunto set my hand, this 18th day of November, 1867.

FRANKLIN R. SHERMAN.

Witnesses:
CHAUNCEY T. LEE,
GEO. W. FOSDICK.